United States Patent
Bailey

(10) Patent No.: US 9,669,742 B1
(45) Date of Patent: Jun. 6, 2017

(54) CAR SEAT COVER SYSTEM AND METHOD

(71) Applicant: Truck Shields, LLC, Salt Lake City, UT (US)

(72) Inventor: Clark C. Bailey, Park City, UT (US)

(73) Assignee: Truck Shields, LLC, Salt Lake City, UT (US)

( * ) Notice: Subject to any disclaimer, the term of this patent is extended or adjusted under 35 U.S.C. 154(b) by 0 days.

(21) Appl. No.: 14/187,129

(22) Filed: Feb. 21, 2014

(51) Int. Cl.
*B60N 2/58* (2006.01)

(52) U.S. Cl.
CPC .................. *B60N 2/5816* (2013.01)

(58) Field of Classification Search
USPC ................ 297/219.1, 220, 228.12, 229
See application file for complete search history.

(56) References Cited

U.S. PATENT DOCUMENTS

| | | | | |
|---|---|---|---|---|
| RE16,288 E | * | 3/1926 | Eddins ........................... | 297/229 |
| 2,123,667 A | * | 7/1938 | Trubitz ................... | A47C 31/11 297/224 |
| 2,227,180 A | * | 12/1940 | Falk ..................... | B60N 2/6054 297/223 |
| 2,313,878 A | * | 3/1943 | Kline ............................ | 297/226 |
| 2,627,303 A | | 2/1953 | Bard | |
| 2,734,558 A | * | 2/1956 | Waranch ................. | A47C 31/11 297/229 |
| RE24,279 E | * | 2/1957 | Schutte .................. | A47C 31/11 297/227 |
| 2,789,630 A | * | 4/1957 | Lyle ........................ | B60N 2/60 297/224 |
| 2,817,391 A | * | 12/1957 | Zacks ........................... | 297/229 |
| 5,613,730 A | * | 3/1997 | Buie et al. ................ | 297/180.12 |
| 5,803,539 A | * | 9/1998 | Dewar et al. ............. | 297/228.12 |
| 6,447,059 B1 | * | 9/2002 | Jackson et al. ........... | 297/228.12 |
| 6,676,209 B1 | * | 1/2004 | Szabo et al. .............. | 297/219.1 |
| 6,709,055 B2 | * | 3/2004 | Gengler et al. ........... | 297/228.13 |
| 6,722,733 B2 | * | 4/2004 | Schmidt et al. ............... | 297/229 |
| 7,066,535 B2 | * | 6/2006 | Moses ..................... | B60R 22/00 297/219.1 |
| 7,261,375 B2 | * | 8/2007 | Godshaw et al. ........ | 297/228.12 |
| 7,287,813 B2 | * | 10/2007 | Aliev .......................... | 297/219.1 |
| 7,931,335 B1 | * | 4/2011 | Siklosi et al. ................ | 297/229 |
| 9,010,856 B2 | * | 4/2015 | Krankkala .............. | B60R 22/00 297/219.1 |
| 2002/0096919 A1 | * | 7/2002 | Sparks .................. | B60N 2/6036 297/228.12 |
| 2005/0236874 A1 | * | 10/2005 | Godshaw et al. .............. | 297/35 |

\* cited by examiner

*Primary Examiner* — Charles A Fox
*Assistant Examiner* — Christopher E Veraa
(74) *Attorney, Agent, or Firm* — Austin Rapp & Hardman

(57) ABSTRACT

An apparatus for covering a bench seat may have a seat cover with an installed configuration in which the seat cover is secured to the bench seat via a plurality of anchoring elements. The seat cover may have a support portion securable to a support member of the bench seat, and a backrest portion securable to a backrest member of the bench seat. The support portion may define a support recess, and the backrest portion may define a backrest recess. The backrest portion may have two rear backrest panels that define an intermediate backrest gap that is spanned by a rear flexible strap. Other anchoring elements may include one or more flexible connectors secured to a rigid feature of the vehicle, blocking member connectors extending between adjoining portions of the support portion and the backrest portion, and/or draw string elements that tighten the seat cover around the bench seat.

8 Claims, 13 Drawing Sheets

CAR SEAT COVER SYSTEM AND METHOD

TECHNICAL FIELD

The present invention relates to vehicle seating, and more particularly, to automotive car seat covers.

BACKGROUND

The seating in a vehicle is critical to the comfort of its occupants. Many different materials, including natural fabrics, synthetic fabrics, polymers, leather, and the like, may be used to upholster vehicle seating. Such materials can be subject to a variety of conditions, such as high and low temperatures, direct sunlight, spilled or dropped food or drinks, and the like. Accordingly, it is not uncommon for vehicle seating to become worn, stained, damaged, or otherwise impaired after a period of use.

Seat covers can help to restore the look and/or feel of vehicular seating without the need to reupholster or replace worn seating. Many types of seat covers exist. Unfortunately, known seat covers are limited in many respects.

More specifically, many known seat covers are expensive enough that only minimal cost savings remain over reupholstering or replacing the original seating. Some known seat covers are complex and difficult to install and/or fail to fit the seat securely enough. This can result in seat covers that shift from their optimal locations, detracting from the desired look and feel. Many known seat covers are highly seat-specific, requiring the user to select the proper seat cover from a large inventory.

Accordingly, for these and other reasons, improved apparatuses and methods for covering a bench seat of a vehicle are desirable.

SUMMARY

Embodiments of apparatuses and/or methods for covering a bench seat of a vehicle are provided below for illustrative purposes and are in no way limiting of the claimed subject matter.

Such an apparatus may include a seat cover and a plurality of anchoring elements that can be used to secure the seat cover to the bench seat in an installed configuration. The seat cover may have a support portion and a backrest portion that can be installed to generally cover a support member and a backrest member, respectively, of the bench seat.

The anchoring elements may include a rear flexible strap, one or more support straps, a draw string element, one or more blocking member connectors, and one or more lower flexible connectors. The rear flexible strap may span an intermediate backrest gap of a rearward-facing backrest member surface of the bench seat to maintain tension in the seat cover. The support straps may secure the rear flexible strap to the backrest portion of the seat cover.

The draw string element may be used to constrict a support recess of the support portion in order to cause the support portion to tightly retain the support member of the bench seat. The blocking member connectors may be inserted between the support member and the backrest member, and may have blocking members that keep them in position between the support member and the backrest member. The lower flexible connectors may have hooks attached to one or more rigid features of the vehicle, displaced from the bench seat.

The apparatus may be installed on the bench seat by placing the seat cover on the bench seat, positioning rear backrest panels of the backrest portion, tightening the rear flexible strap, inserting the blocking member connectors between the support member and the backrest member, covering the support member with the backrest portion, securing the lower flexible connectors to one or more rigid features, and then tightening the draw string element.

If a center console of the bench seat is to be used, an intermediate section of the forward backrest panel may be detached from adjoining first and second sections of the backrest panel. The center console may then be deployed between the first and second sections.

If the center seat belt of the bench seat has a shoulder harness, the intermediate section may be detached from the corresponding one of the first side section and the second side section. The shoulder harness may then be routed outside the forward backrest panel, and the intermediate section may be re-attached to the corresponding side section.

If the shoulder harness passes under the rear flexible strap, the rear flexible strap may be detached. The shoulder harness may then be routed outside the rear flexible strap, and the rear flexible strap may be re-attached.

Thus, embodiments of the disclosed subject matter may provide simple and effective seat coverage that may be used for a wide variety of vehicle seating. The apparatus may enable the center section of the vehicle seating to be used for a vehicle passenger with a shoulder harness and/or a center console coupled to the bench seat.

BRIEF DESCRIPTION OF THE DRAWINGS

Embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

Figure 1:
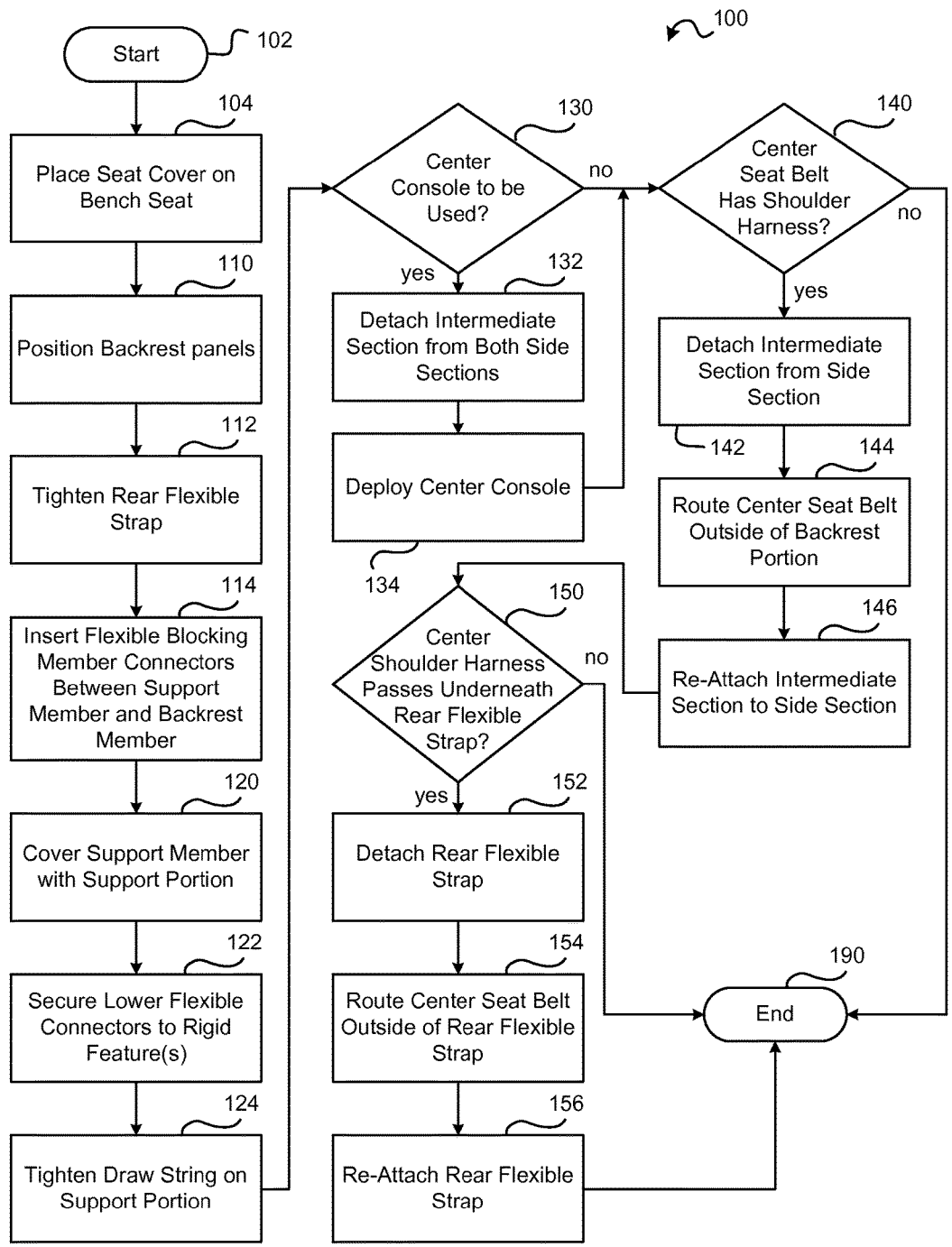
FIG. 1 is a flowchart diagram illustrating one method of installing a seat cover according to the present invention.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various embodiments of the invention will now be described in greater detail in connection with FIGS. 1-13. The drawings and associated descriptions are merely exemplary. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Various definitions apply to the present disclosure. The term "panel" or "panels" signifies a portion of a seat cover that may be integral with, separate from, abutting but unsecured to, or secured to one or more surrounding portions of the seat cover. The panel may be comprised of one or more elements that are physically discrete, integrally formed, or mutually secured.

In one embodiment, the phrase "substantially cover" or "substantially covers" signifies covering at least 70% of the identified area. In alternative embodiments, these terms signify covering at least 50%, 60%, 80%, 90% or 95% of the identified area. The term "entirely covers" or "entirely cover" signifies that the entire identified area is covered.

A "flexible connector" includes any flexible structure capable of securing two objects together. Thus, a flexible connector may include, for example, a strap, string, cord, elastic band, or the like. A flexible connector may be formed of any material that provides the necessary flexibility including, but not limited to, natural fabrics, synthetic fabrics, polymers, elastomers, and combinations thereof. A "strap" is a type of flexible connector.

The terms "proximal" and "distal" generally refer to parts or regions that are, respectively, closer to or further from the center of an object or system. A "proximal end" of an object may be the end that is maintained closer to the body of a user or a larger object to which the first object is coupled. Conversely, a "distal end" of an object may be the end that is maintained further from the body of a user or a larger object to which the first object is coupled.

An "anchoring element" is any structure that serves to anchor two other items together. Anchoring elements can use any known attachment scheme, including, but not limited to, various forms of mechanical fastening, welding, adhesive or chemical bonding, and the like.

Referring to FIG. 1, a flowchart diagram illustrates a method 100 of installing an apparatus according to one embodiment of the present invention. The apparatus may include a seat cover and a plurality of anchoring elements that are used to secure the seat cover to the bench seat. The seat cover may have a support portion attachable to a support member of the bench seat, and a backrest portion attachable to a backrest portion of the bench seat. FIG. 1 will provide an overview of the method 100, which will be described in greater detail in connection with FIG. 2 through FIG. 13.

The method 100 may start 102 with a step 104 in which the seat cover is placed on a bench seat. Then, in a step 110, backrest panels of the backrest portion of the seat cover may be positioned on a rearward-facing backrest member surface of the backrest of the bench seat. Then, in a step 112, a rear flexible strap of the anchoring elements may be used. The rear flexible strap may extend between the backrest panels and may be tightened.

The method 100 may then proceed to a step 114, in which blocking member connectors of the anchoring elements may be inserted between the support member and the backrest member of the bench seat. In a step 120, the support portion of the seat cover may be used to cover the support member of the bench seat. In a step 122, lower flexible connectors of the anchoring elements may be secured to one or more rigid features of the vehicle proximate the bench seat. Then, in a step 124, an anchoring element in the form of a draw string element on the support portion of the seat cover may be tightened to secure the support portion of the seat cover to the support member of the bench seat.

The method 100 may then proceed to a query 130. Pursuant to the query 130, if the bench seat has a center console that is to be used, the method 100 may proceed to a step 132 in which an intermediate section of the backrest portion of the seat cover may be detached from first and second side sections of the backrest portion. The intermediate section may be folded and/or rolled against the support portion so that, in a step 134, the center console may be deployed so that it extends between the first and second side sections.

If the bench seat does not have a center console, or the user does not wish to use the center console, the method 100 may proceed to a query 140. The method 100 may also proceed to the query 140 after step 134 has been performed, to give a vehicle user maximum flexibility as to whether to use a center console or have a center passenger occupying the center of the bench seat. In alternative embodiments, the method 100 may proceed, instead, to the query 150 after completion of the step 134.

Pursuant to the query 140, if the center section of the bench seat does not have a seat belt with a shoulder harness, the method 100 may end 190. If the center section of the bench seat has a seat belt with a shoulder harness, the shoulder harness will extend generally between the center section and one of the side sections of the backrest member. In a step 142, the intermediate section of the backrest portion may be detached from the side section adjacent to the shoulder strap. In a step 144, the shoulder harness of the center seat belt may be routed to the outside of the backrest portion. Then, in a step 146, the intermediate section may be re-attached to the side section from which it was detached.

Once the step 146 has been carried out, the method 100 may proceed to a query 150. Pursuant to the query 150, if the center shoulder harness does not pass underneath the flexible strap, the method 100 may then end 190. If the center shoulder harness passes underneath the rear flexible strap, the method 100 may proceed to a step 152. In the step 152, the rear flexible strap may be detached. Then, in a step 154, the shoulder strap of the center seat belt may be routed outside of the rear flexible strap. In a step 156, the rear flexible strap may be re-attached and tightened as needed. The method 100 may then end 190.

In the embodiment of FIG. 1, the query 130, the query 140, and the query 150 will all have been carried out by the time the step 156 is performed. However, those of skill in the art will recognize that the various steps and/or queries of the method 100 may be reordered in a wide variety of ways. In alternative embodiments, the query 150 may be carried out prior to the query 130 and/or the query 140. In such embodiments, the method 100 may proceed to the query 130 and/or the query 140, as needed, after performance of the step 156. Indeed, in alternative embodiments, the various steps and queries of the method 100 may be revised, omitted, replaced with other steps or queries, and/or supplemented with other steps or queries.

The method 100 will now be illustrated and described in greater detail in connection with FIG. 2 through FIG. 13, as follows. FIG. 2 through FIG. 13 illustrate one exemplary embodiment of the invention; various components and/or method steps may be changed to provide many alternatives within the scope of the invention.

Figure 2:
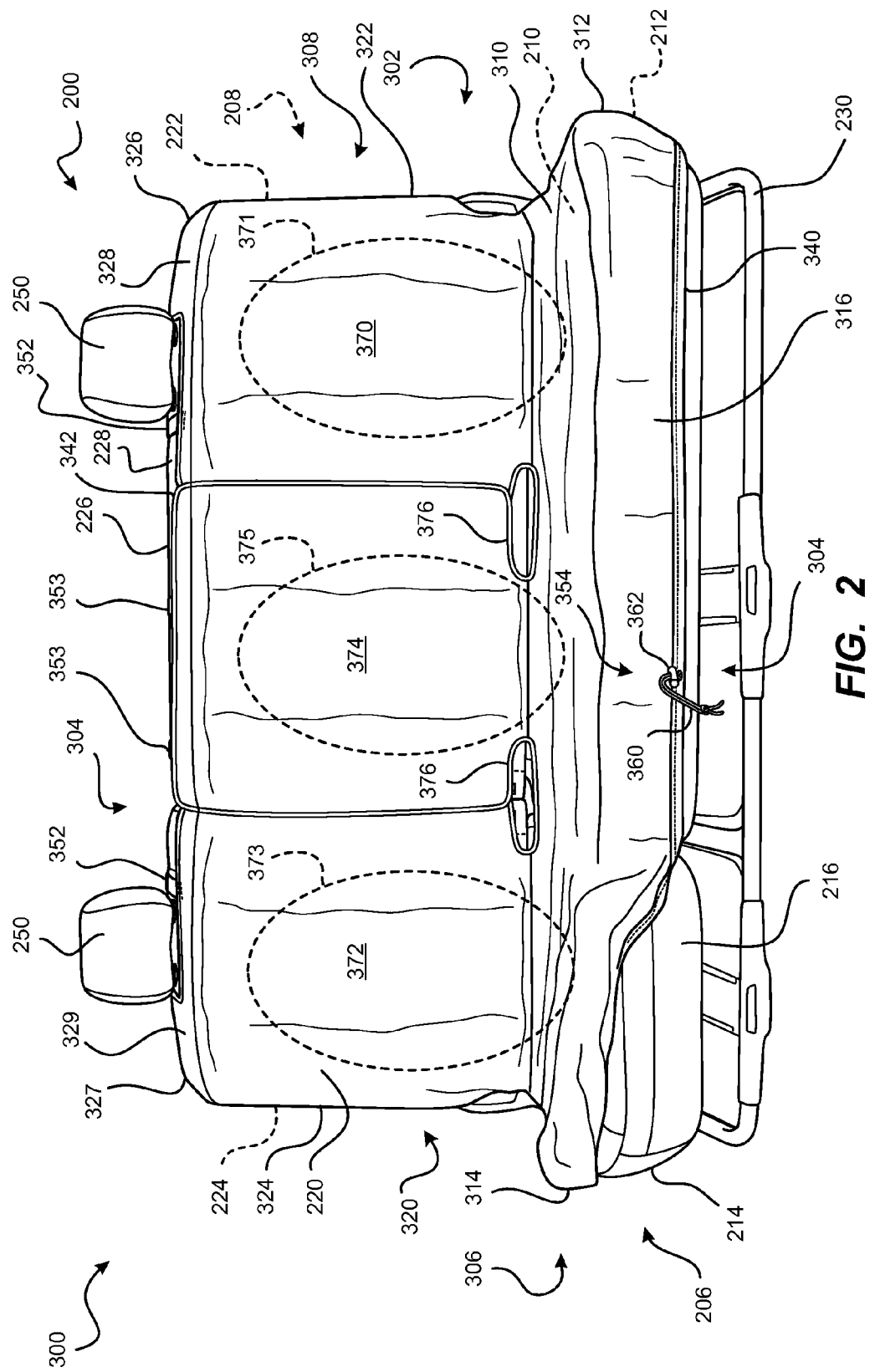
FIG. 2 is a front elevation, perspective view of a bench seat of a vehicle, with an apparatus according to one embodiment of the invention, including a seat cover positioned on a bench seat.

Referring to FIG. 2, a front elevation, perspective view illustrates a bench seat 200 of a vehicle, with an apparatus 300 according to one embodiment of the invention, including a seat cover 302 positioned on the bench seat 200. The bench seat 200 may be in any type of vehicle, including but not limited to automobiles, commercial trucking, planes, trains, boats, or the like. The bench seat 200 may have a generally consistent shape across its width (i.e., from the left side to the right side), and may optionally be sized to accommodate three people (i.e., one on the left side, one on the right side, and one in the center).

Relative to the bench seat 200, the words "forward," "rearward" "upward," and "lateral" may be used. These words may relate to the position of one or more passengers relative to the bench seat 200. More specifically, a "forward" or "forward-facing" member or surface may be one that is displaced toward the direction in which the passenger faces, or faces the same direction as the passenger. By the same token, a "rearward" or "rearward-facing" member or surface may be one that is displaced away from the direction in which the passenger faces, or faces a direction opposite to the direction in which the passenger faces. An "upward" or "upward-facing" member or surface may be one that is displaced upward relative to the passenger's body, or that faces toward a space above the passenger. A "lateral" or "lateral-facing" member or surface may be one that is displaced to the left or right side or that faces leftward or rightward relative to the passenger's body.

The various components of the bench seat 200 will now be set forth. Some of these are more clearly shown in FIG. 3. Parts of the bench seat 200 that are covered, for example, by the apparatus 300, are indicated by phantom leader lines in the drawings.

The bench seat 200 may have a support member 206 and a backrest member 208. The support member 206 may be the portion of the bench seat 200 on which one or more passengers typically sit, and may face generally upward. The passenger may recline against the backrest member 208; thus, the backrest member 208 may be positioned generally rearward of the passenger.

The support member 206 may have an upward-facing support member surface 210 on which the passenger sits, a first laterally-facing support member surface 212 facing to the passenger's left, a second laterally-facing support member surface 214 facing to the passenger's right, and a forward-facing support member surface 216. The backrest member 208 may have a forward-facing backrest member surface 220 against which the passenger reclines, a first laterally-facing backrest member surface 222 facing to the passenger's right, a second laterally-facing backrest member surface 224 facing to the passenger's left, a rearward-facing backrest member surface 226 facing rearward, and an upward-facing backrest member surface 228. The bench seat 200 may also have one or more headrests 250, which may extend upward from the upward-facing backrest member surface 228 of the backrest member 208.

The bench seat 200 may reside proximate a rigid feature 230, which may be a portion of a frame of the vehicle, a support frame that supports the bench seat 200, a part of a frame for the bench seat 200, or the like. In the exemplary embodiment of FIG. 2, the rigid feature 230 may reside underneath the bench seat 200.

The apparatus 300 may be used to cover the bench seat 200. The apparatus 300 may have a seat cover 302 with an installed configuration in which the seat cover 302 is secured to the bench seat 200 to generally cover the various components of the support member 206 and the backrest member 208, as set forth above. The apparatus 300 may further have a plurality of anchoring elements 304 that secure the seat cover 302 to the bench seat 200. The apparatus 300 may be relatively easily installed through the use of the steps set forth in the description of FIG. 1, which will be further described in connection with FIGS. 2-13.

FIG. 2 illustrates the apparatus 300 after the performance of the step 104 and the step 110. Thus, the seat cover 302 may have been draped over the bench seat 200 in preparation for further steps, and rear backrest panels 326, 327 of the seat cover 302, which will be described subsequently, may have been positioned on the rearward-facing backrest member surface 226 of the bench seat 200.

The seat cover 302 may have a support portion 306 that covers the support member 206 in the installed configuration, and a backrest portion 308 that covers the backrest member 208 in the installed configuration. The support portion 306 and the backrest portion 308 may have various components that correspond to and/or are shaped to cover the components of the support member 206 and the backrest member 208, respectively, as set forth above.

More specifically, the support portion 306 may have an upward support panel 310 that substantially covers the upward-facing support member surface 210, a first lateral support panel 312 that substantially covers the first laterally-facing support member surface 212, a second lateral support panel 314 that substantially covers the second laterally-facing support member surface 214, and a forward-facing support panel 316 that substantially covers the forward-facing support member surface 216.

Similarly, the backrest portion 308 may have a forward backrest panel 320 that substantially covers the forward-facing backrest member surface 220, a first lateral backrest panel 322 that substantially covers the first laterally-facing backrest member surface 222, and a second lateral backrest panel 324 that substantially covers the second laterally-facing backrest member surface 224. The backrest portion 308 may further have a first rear backrest panel 326 and a first upward backrest panel 328 that cooperate to cover a portion of the rearward-facing backrest member surface 226, and a second rear backrest panel 327 and a second upward backrest panel 329 that cooperate to cover a portion of the upward-facing backrest member surface 228. The first rear backrest panel 326 and the second rear backrest panel 327 are more clearly shown in FIG. 3.

The first lateral support panel 312, the second lateral support panel 314, and the forward-facing support panel 316 of the support portion 306 may cooperate to define a support recess 340 within which the support member 206 of the bench seat 200 may generally be captured. Similarly, the forward backrest panel 320, the first lateral backrest panel 322, the second lateral backrest panel 324, the first rear backrest panel 326, the second rear backrest panel 327, the first upward backrest panel 328, and the second upward backrest panel 329 of the backrest portion 308 may cooperate to define a backrest recess 342 within which the backrest member 208 of the bench seat 200 may generally be captured.

The support recess 340 may leave a central region of a downward-facing surface of the support member 206 generally exposed to avoid interference with the structural support that secures the bench seat 200 to the vehicle. This structural support may include the rigid feature 230. As more clearly shown in FIG. 3, the backrest recess 342 may leave a central region of the upward-facing backrest member surface 228 and a central region of the rearward-facing backrest member surface 226 generally exposed as well; this exposure may avoid interference with the attachment of the headrests 250 to the remainder of the bench seat 200 and/or facilitate user access to any adjustment controls, accessory mounts, or other features (not shown) that may be present on the upward-facing backrest member surface 228 or the rearward-facing backrest member surface 226.

The anchoring elements 304 may include a variety of elements that cooperate to keep the seat cover 302 secured to the bench seat 200. The anchoring elements 304 may optionally include a rear flexible strap 350, a plurality of support straps 352-353, a draw string element 354, blocking member connectors 356, and/or lower flexible connectors 358. As also illustrated in FIG. 4, each of the lower flexible connectors 358 may have a proximal end 410 and a distal end 412. A hook 414 may be positioned on the distal end 412. The draw string element 354 is visible in FIG. 2; the other anchoring elements 304 will be shown and described in greater detail in connection with FIGS. 3-7.

As shown, the draw string element 354 may have a draw string 360 and a gripper 362. The draw string 360 may generally encircle the support recess 340, and may thus be secured to distal edges of the forward-facing support panel 316, the first lateral support panel 312, and the second lateral support panel 314. The forward-facing support panel 316, the first lateral support panel 312, the second lateral support panel 314, the first lateral backrest panel 322, and the second lateral backrest panel 324 may define at their distal edges, a passageway through which the draw string 360 is slidable.

When the draw string 360 is tightened, the distal edges of the forward-facing support panel 316, the first lateral support panel 312, and the second lateral support panel 314 may be drawn together to reduce the size of the support recess 340 and cause the support portion 306 to grip the support member 206. The gripper 362 may take the form of a barrel lock or the like, and may have internal elements (not shown) that resiliently engage the draw string 360 to maintain the tension in the draw string 360 until the gripper 362 is actuated by a user to release the tension.

The forward backrest panel 320 may be generally divided into three sections, each of which supports and is positioned generally rearward of a position that can be occupied by a passenger of the bench seat 200. More precisely, the forward backrest panel 320 may have a first side section 370 adjacent to the first lateral backrest panel 322, a second side section 372 adjacent to the second lateral backrest panel 324, and an intermediate section 374 between the first side section 370 and the second side section 372.

The first side section 370, the second side section 372, and the intermediate section 374 may be positioned rearward of a first side passenger region 371, a second side passenger region 373, and a center passenger region 375, respectively. The first side passenger region 371, the second side passenger region 373, and the center passenger region 375 may each comprise regions that can be occupied by passengers of the bench seat 200.

When the bench seat 200 is fully occupied, the first side section 370 may be positioned rearward of a passenger of the left-hand side of the bench seat 200, the second side section 372 may be positioned rearward of a passenger the right-hand side of the bench seat 200, and the intermediate section 374 may be positioned rearward of a passenger the center of the bench seat 200. The intermediate section 374 may be detachable from the first side section 370 and/or the second side section 372, as will be set forth in more detail subsequently.

The first side section 370, the second side section 372, and the intermediate section 374 may be shaped to leave two seat belt openings 376 positioned generally at the juncture of the upward support panel 310 with the forward backrest panel 320, between the intermediate section 374 and each of the first side section 370 and the second side section 372. The seat belt openings 376 may be sized to permit a seat belt buckle to extend therethrough.

Figure 3:
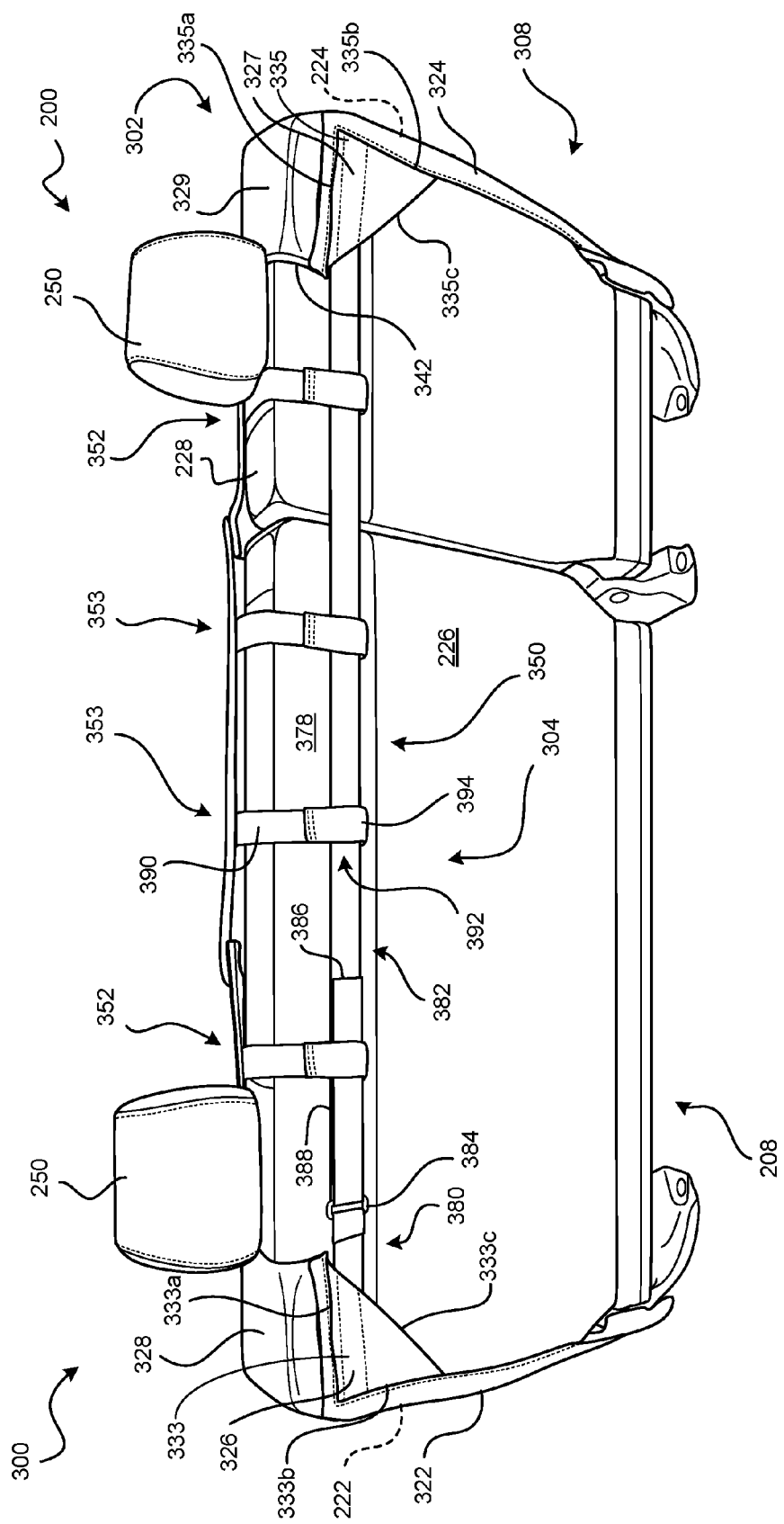
FIG. 3 is a rear elevation, perspective view of the bench seat and apparatus of FIG. 2 with the seat cover after positioning of the backrest panels of the seat cover.
Figure 4:
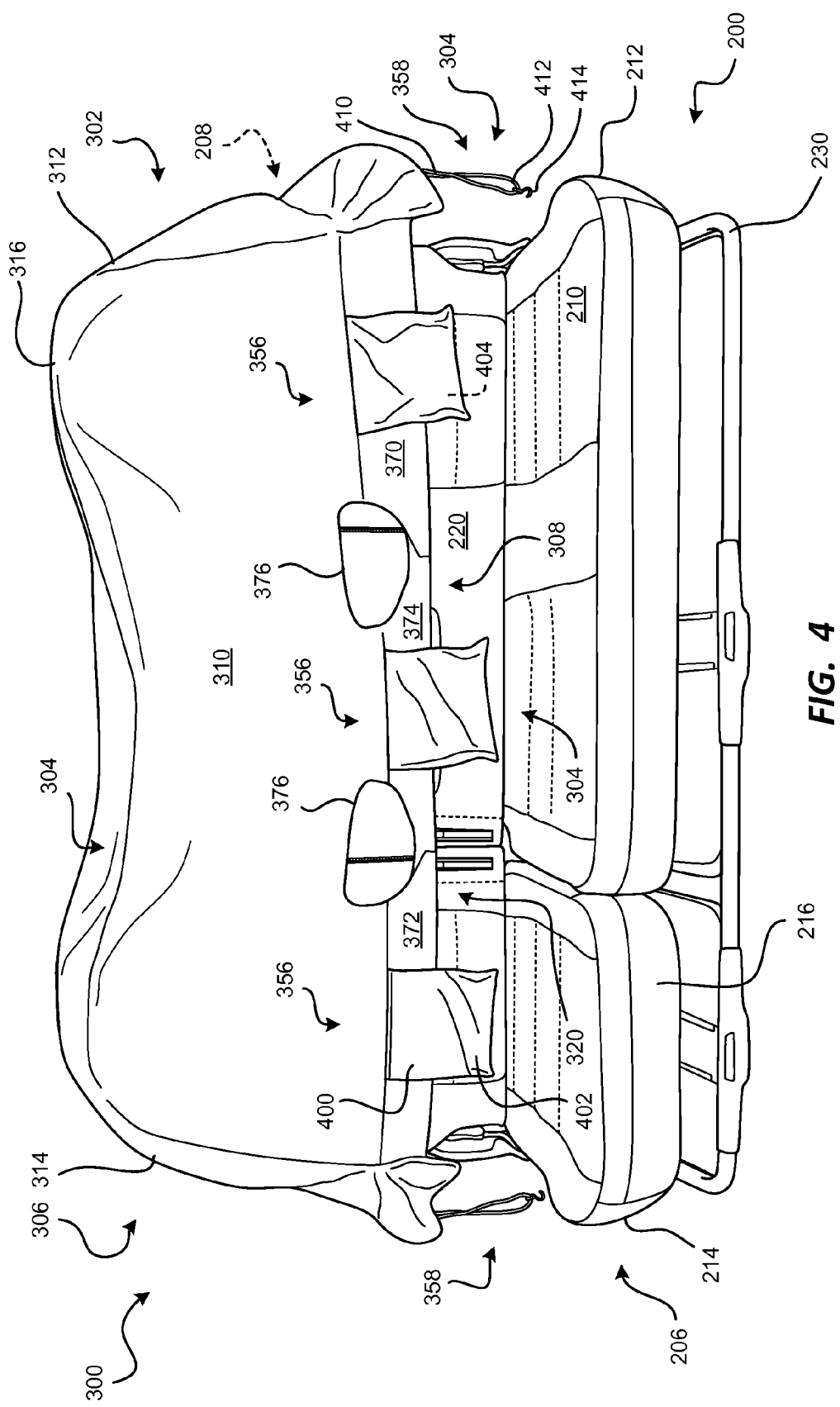
FIG. 4 is a front elevation, perspective view of the bench seat and apparatus of FIG. 2 after tightening of the rear flexible strap with the support portion lifted in preparation for installation of the blocking member connectors.

Referring to FIG. 3, a rear elevation, perspective view illustrates the bench seat 200 and apparatus 300 of FIG. 2, with the seat cover 302 after positioning of the first rear backrest panel 326 and the second rear backrest panel 327 of the backrest portion 308. More specifically, in order to bring the apparatus 300 to the configuration shown in FIG. 2 and FIG. 3, the seat cover 302 may be draped on the bench seat 200 so that the support portion 306 rests on the support member 206 and the backrest portion 308 rests on the backrest member 208. The first rear backrest panel 326 and the second rear backrest panel 327 may be drawn over the upward-facing backrest member surface 228 of the bench seat 200 and positioned to rest on the rearward-facing backrest member surface 226.

Thus, the first rear backrest panel 326 and the second rear backrest panel 327 may occupy the top corners of the rearward-facing backrest member surface 226 as shown in FIG. 3. The first upward backrest panel 328 and the second upward backrest panel 329 may rest on the upward-facing backrest member surface 228. In various embodiments, as illustrated in FIG. 3, the first rear backrest panel 326 may comprise a first triangular panel member 333 bounded by a first upper seam 333a, a first outer seam 333b, and a first peripheral edge 333c extending between the first upper seam 333a and first outer seam 333b. Further, the second rear backrest panel 327 comprises second triangular panel member 335 bounded by a second upper seam 335a, a second outer seam 335b, and a second peripheral edge 335c extending between the second upper seam 335a and second outer seam 335b. In various embodiments, as illustrated in FIG. 3, a length of first peripheral edge 333c between the first outer seam 333b and a first upper seam 333a is greater than either a length of the first upper seam 333a between the first peripheral edge 333c and the first outer seam 333b or a length of the first outer seam 333b between the first upper seam 333a and the first peripheral edge 333b. In various embodiments, as also illustrated in FIG. 3, a length of second peripheral edge 335c between the second outer seam 335b and a second upper seam 335a is greater than either a length of the second upper seam 335a between the second peripheral edge 335c and the second outer seam 335b or a length of the second outer seam 335b between the second upper seam 335a and the second peripheral edge 335c.

The rear flexible strap 350 may be secured to the first rear backrest panel 326 and the second rear backrest panel 327. The rear flexible strap 350 may be positioned to span an intermediate backrest gap 378 of the rearward-facing backrest member surface 226. In one embodiment, the intermediate backrest gap 378 extends across at least the majority of the rearward-facing backrest member surface 226 of the backrest member 208. In alternative embodiments, the intermediate backrest gap 378 extends across at least 30%, 40%, 50%, 60%, 70%, 80%, 90% or 95% of the rearward-facing backrest member surface 226 of the backrest member 208.

In the step 112 of FIG. 1, the rear flexible strap 350 may be tightened to maintain tension between the first rear backrest panel 326 and the second rear backrest panel 327, and thence, among the remainder of the backrest portion 308. This tightening may be performed in many ways, one of which will be shown and described in connection with the exemplary embodiment of FIG. 3.

The rear flexible strap 350 may have a first portion 380 and a second portion 382, which may be secured to the first rear backrest panel 326 and the second rear backrest panel 327, respectively. The first portion 380 and the second portion 382 may be adjustably secured together such that the overall length of the rear flexible strap 350 can be easily adjusted. This may be done in a wide variety of ways. In the embodiment of FIG. 3, the second portion 382 may have an adjustable length.

More precisely, the first portion 380 may terminate in a loop 384 about which the adjoining end of the second portion 382 may be wrapped. The second portion 382 may have a fastener that can be fastened at multiple positions along the length of the second portion 382. Such fasteners in include adjustable belts, hook and loop fastening systems, adjustable clips, and the like.

In the embodiment of FIG. 3, a hook and loop fastening system may be used. The hook and loop fastening system may include a hook end portion 386 and a loop end portion 388. The hook end portion 386 may have a series of small, flexible hooks that engage corresponding flexible loops of the loop end portion 388. The hook end portion 386 may be easily detached from the loop end portion 388 and shifted to a different location on the loop end portion 388 for re-attachment, thereby increasing or decreasing the length of the second portion 382. Tightening the rear flexible strap 350 may entail detaching the hook end portion 386 from the loop end portion 388, drawing the hook end portion 386 further through the loop 384, and then re-attaching the hook end portion 386 to the loop end portion 388.

The support straps 352-353 may couple the rear flexible strap 350 to the forward backrest panel 320 of the backrest portion 308. Each of the support straps 352 may have a proximal end 390 and a distal end 392. The proximal end 390 of each of the support straps 352-353 may be secured to the distal peripheral portion of the forward backrest panel 320 or to a front flexible strap 430 (shown in FIG. 8) secured to the forward backrest panel 320, as will be shown subsequently. The "distal peripheral portion" is a peripheral portion of the forward backrest panel 320 most remote from the upward support panel 310.

The distal end 392 of each of the support straps 352-353 may have a loop 394, which may optionally be formed by attachment of a terminal portion of the distal end 392 to a more proximal portion of the distal end 392. The rear flexible strap 350 may pass through the loop 394 of each of the support straps 352-353. The loops 394 may permit the rear flexible strap 350 to pass relatively easily therethrough so that the rear flexible strap 350 can easily be tightened and/or loosened, while remaining coupled to the support straps 352-353.

Referring to FIG. 4, a front elevation, perspective view illustrates the bench seat 200 and apparatus 300 of FIG. 2 after tightening of the rear flexible strap 350, with the support portion 306 lifted in preparation for installation of the blocking member connectors 356 in the step 114. As shown, each of the blocking member connectors 356 may have a proximal end 400 and a distal end 402. Each proximal end 400 may be secured to the juncture of the support portion 306 with the backrest portion 308.

More specifically, one proximal end 400 may be secured to the juncture of the first side section 370 with the support portion 306, another may be secured to the juncture of the second side section 372 with the support portion 306, and yet another may be secured to the juncture of the intermediate section 374 with the support portion 306. Thus, the anchoring elements 304 may include three blocking member connectors 356. However, in alternative embodiments, more or fewer blocking member connectors 356 may be used.

The blocking member connectors 356 may each have a flexible structure, and may optionally be formed of a fabric such as that used to form the seat cover 302. Each distal end 402 may have a blocking member 404, which may be somewhat larger than the proximal end 400. Each blocking member 404 may also be larger than the gap between the support member 206 and the backrest member 208 of the bench seat 200. According to one embodiment, each blocking member 404 may be a relatively rigid cylindrical foam member that can be inserted into a pocket formed in the material of the distal end 402. In alternative embodiments, each blocking member 404 may have a different shape and/or compressibility.

The distal end 402 of each of the blocking member connectors 356 may be inserted through the space between the support member 206 and the backrest member 208 of the bench seat 200. This may be done, for example, by removing the blocking member 404 from each distal end 402 and then inserting the distal end 402 through the gap. In embodiments in which the blocking member 404 is compressible, each blocking member 404 may be compressed and then inserted through the gap between the support member 206 and the backrest member 208 of the bench seat 200.

Returning to the exemplary embodiment of FIG. 4, after the distal end 402 of each of the blocking member connectors 356 has been inserted between the support member 206 and the backrest member 208, the blocking member 404 may be coupled to each distal end 402. This may prevent each distal end 402 from being withdrawn again though the space between the support member 206 and the backrest member 208. This will be further shown and described in connection with FIG. 5.

Figure 5:
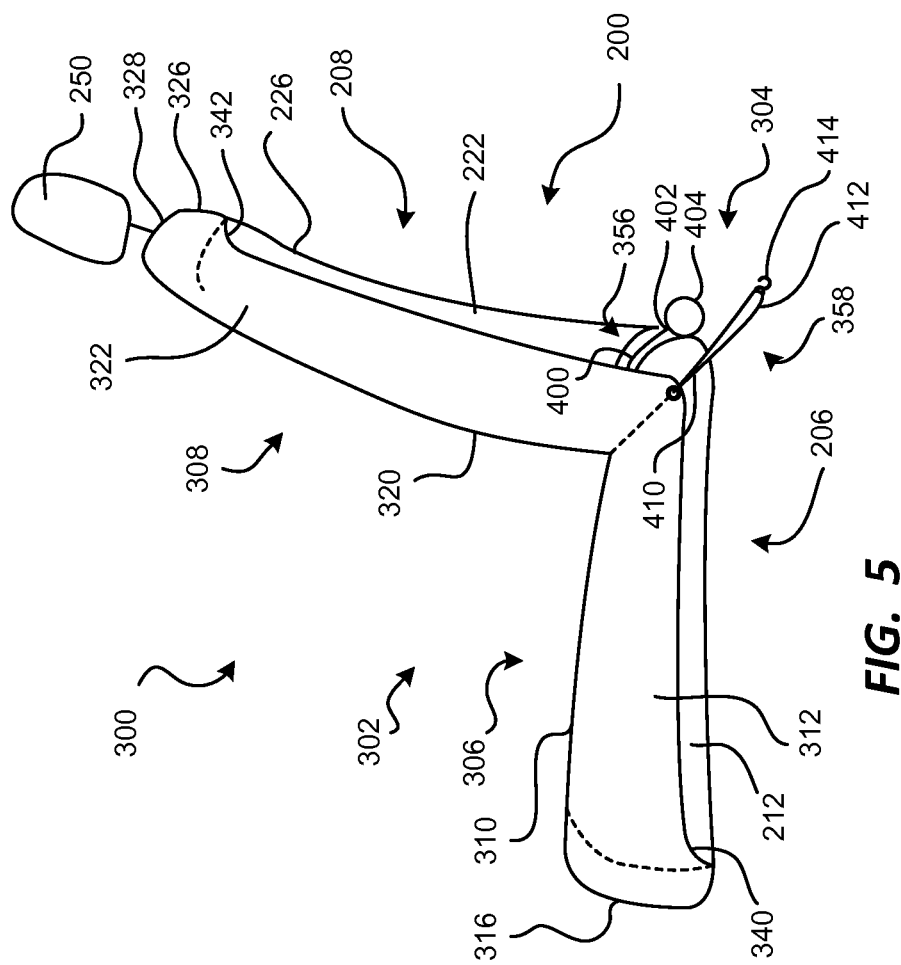
FIG. 5 is a side elevation, perspective view of the bench seat and apparatus of FIG. 2 after insertion of the blocking member connectors between the support member and the backrest member of the bench seat.

Referring to FIG. 5, a side elevation, perspective view illustrates the bench seat 200 and apparatus 300 of FIG. 2 after insertion of the blocking member connectors 356 between the support member 206 and the backrest member 208 of the bench seat 200. As shown, the blocking member 404 of each of the blocking member connectors 356 may be positioned adjacent to the rearward-facing backrest member surface 226 to inhibit forward and/or upward motion of the proximate portions of the support portion 306 and the backrest portion 308. Hence, the blocking member connectors 356 may help to keep the support portion 306 and the backrest portion 308 firmly and relatively tightly secured to the bench seat 200.

The lower flexible connectors 358 may also help to keep the seat cover 302 tightly secured to the bench seat 200. Each of the lower flexible connectors 358 may be secured to the lateral extents of the seat cover 302. Although the embodiment of FIG. 5 has two lower flexible connectors 358, alternative embodiments may have more or fewer lower flexible connectors 358.

As shown in FIG. 5, each of the lower flexible connectors 358 may have a proximal end 410 and a distal end 412. Each proximal end 410 may be secured to the seat cover 302 at the juncture of the first lateral support panel 312 with the first lateral backrest panel 322, or at the juncture of the second lateral support panel 314 with the second lateral backrest panel 324.

Each of the lower flexible connectors 358 may have a hook 414 attached to the distal end 412. The hook 414 may be secured to a rigid feature of the vehicle, such as the rigid feature 230 of FIG. 2. This exterior fixation may function in cooperation with the other anchoring elements 304 to keep the seat cover 302 in place on the bench seat 200. If desired, the lower flexible connectors 358 may be secured to the rigid feature 230, as in the step 122, after the support portion 306 has been repositioned on the support member 206, as in the step 120.

Figure 6:
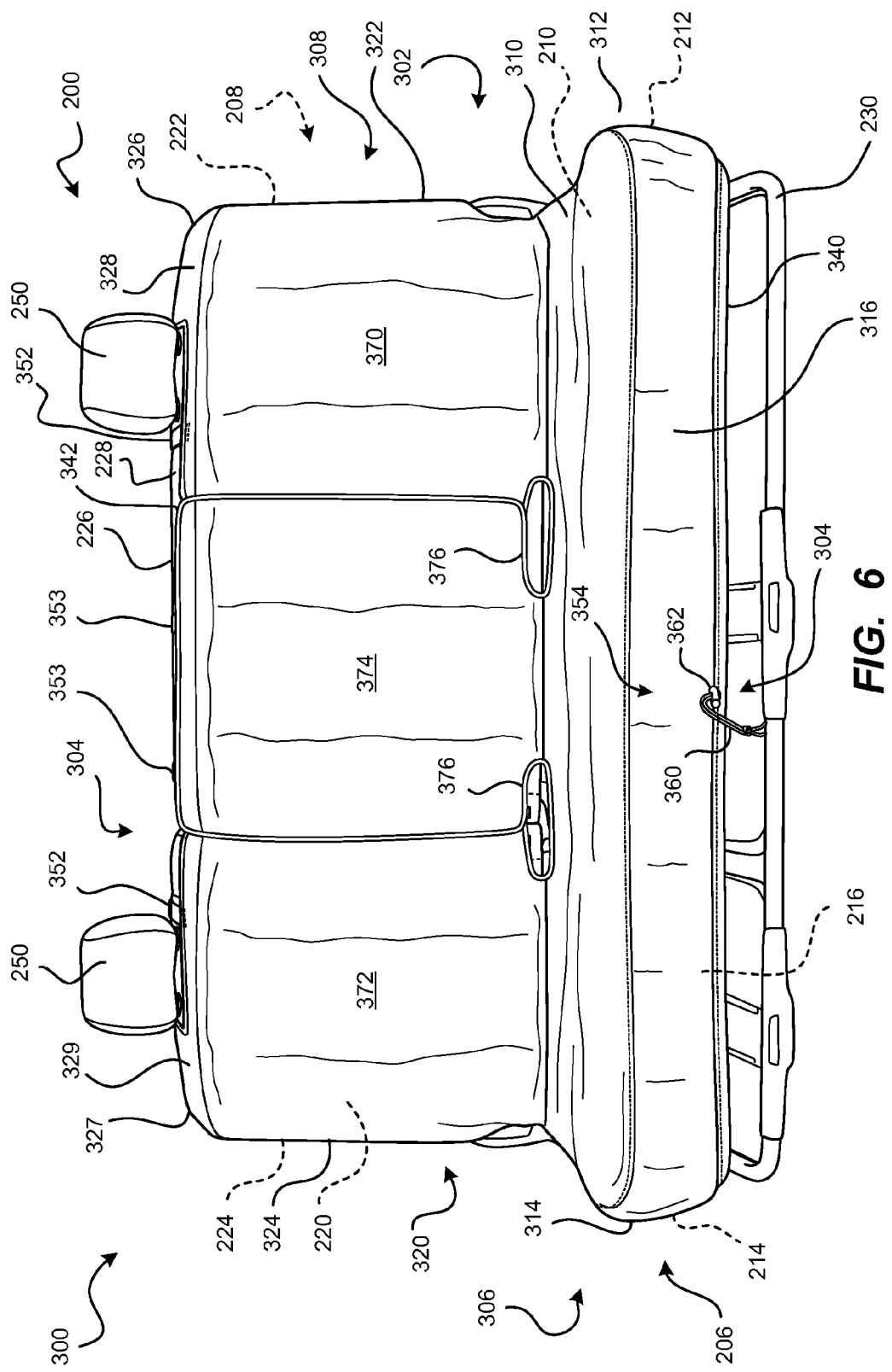
FIG. 6 is a front elevation, perspective view of the bench seat and apparatus of FIG. 2 with the support portion of the seat cover positioned to cover the support member.

Referring to FIG. 6, a front elevation, perspective view illustrates the bench seat 200 and apparatus 300 of FIG. 2 with the support portion 306 of the seat cover 302 positioned to cover the support member 206 of the bench seat 200. This may be representative of the manner in which the support portion 306 is positioned in the step 120 of FIG. 1.

Once the support portion 306 has been positioned in this manner, the support portion 306 may be more firmly attached to the support member 206 through the use of the draw string element 354. More precisely, the draw string 360 of the draw string element 354 may be grasped by the user and pulled to tighten the draw string element 354, thereby reducing the size of the support recess 340 and causing the support portion 306 to grip more tightly to the support member 206.

Figure 7:
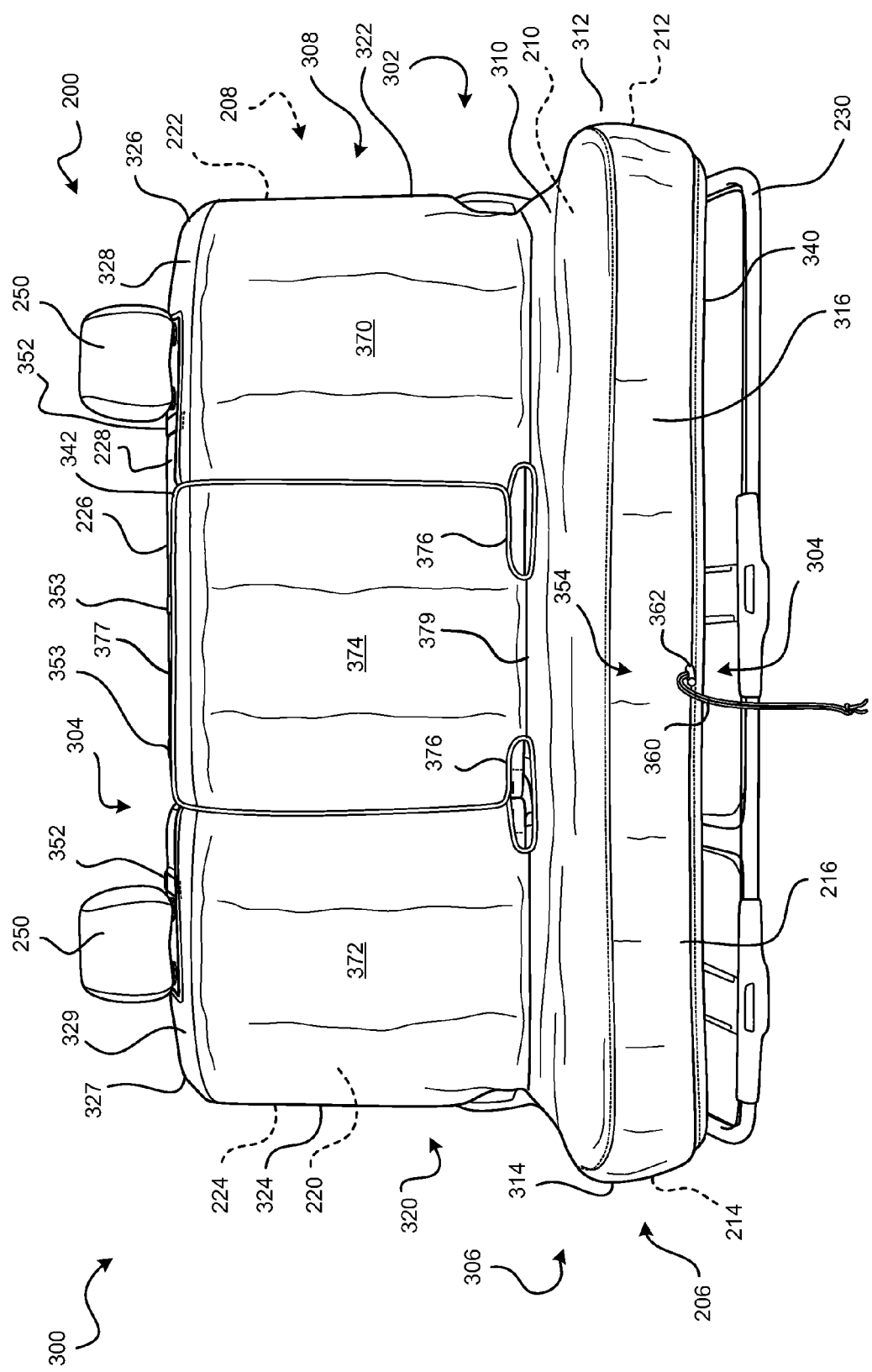
FIG. 7 is a front elevation, perspective view of the bench seat and apparatus of FIG. 2 with the draw string element tightened to secure the support portion of the seat cover on the support member.
Figure 8:
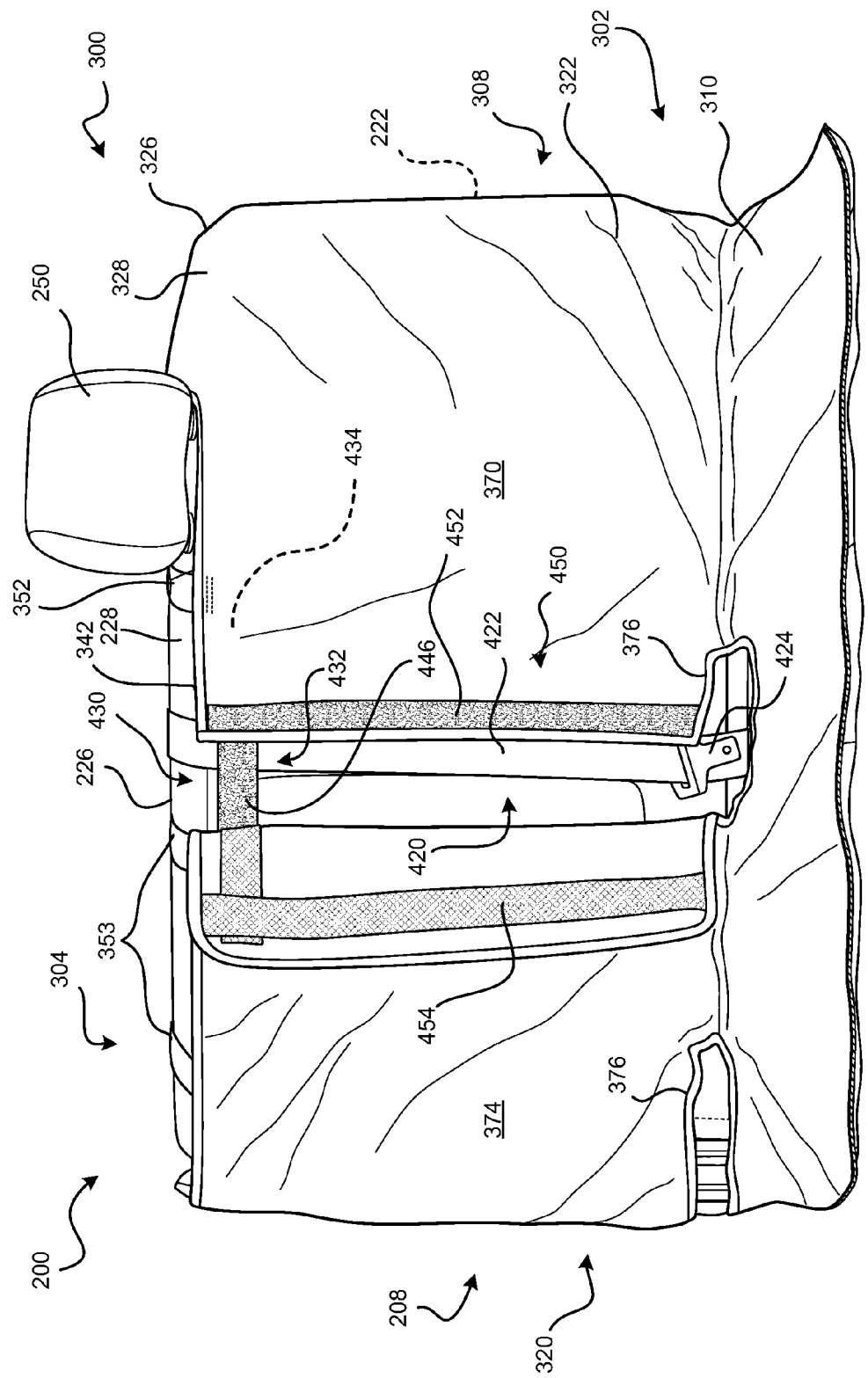
FIG. 8 is a front elevation, perspective view of a portion of the bench seat and apparatus of FIG. 2 with intermediate section of the backrest portion of the seat cover partially detached from the first side of the backrest portion.
Figure 13:
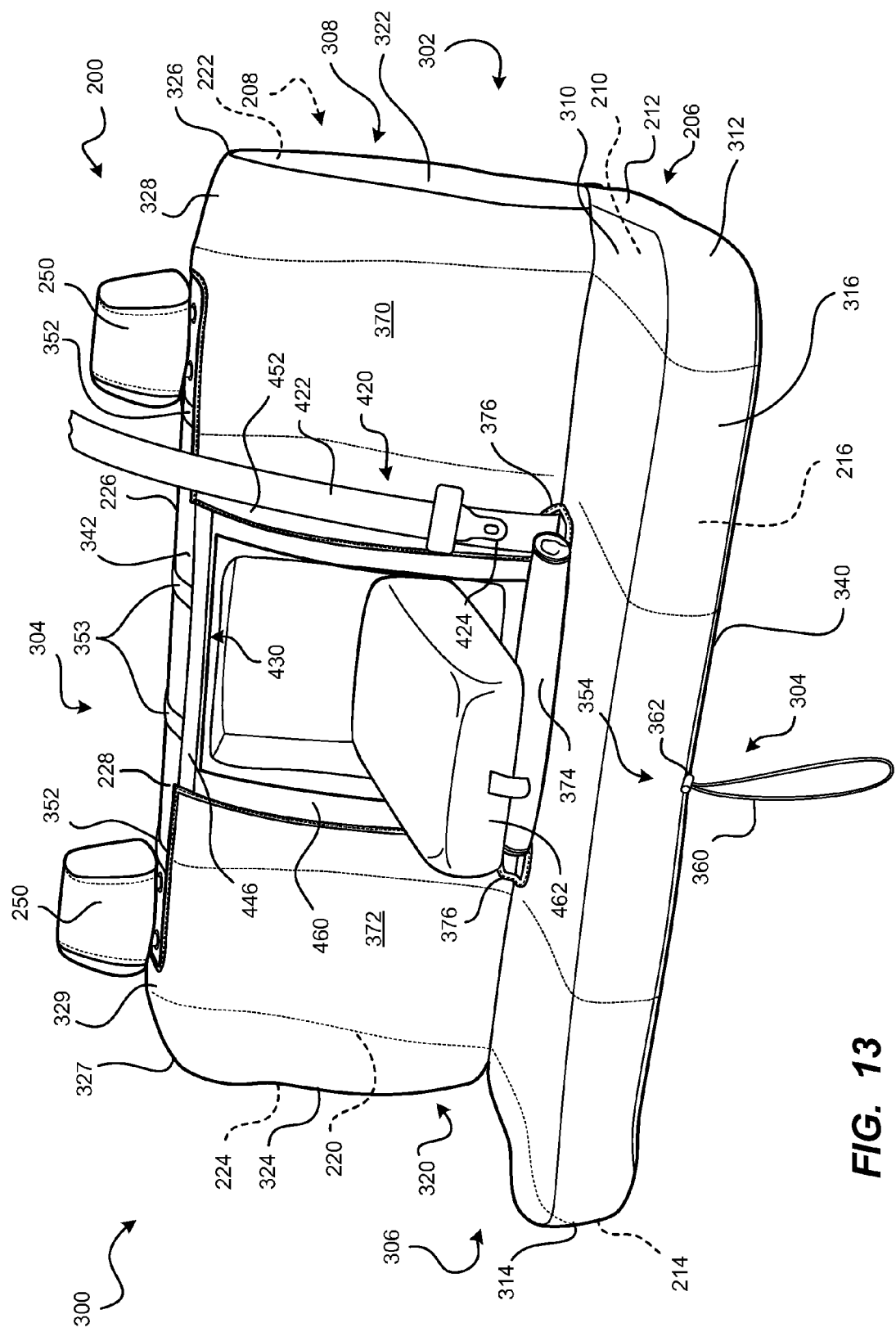
FIG. 13 is a front elevation, perspective view of the bench seat and apparatus of FIG. 2 in the installed configuration, with the intermediate section of the backrest portion of the seat cover detached from the side sections and the center console of the bench seat deployed between the side sections.

Referring to FIG. 7, a front elevation, perspective view illustrates the bench seat 200 and apparatus 300 of FIG. 2 with the draw string element 354 tightened to secure the support portion 306 of the seat cover 302 on the support member 206. Thus, FIG. 7 may illustrate the apparatus 300 after performance of the step 124 of FIG. 1. At this stage, the seat cover 302 may be fully secured to the bench seat 200. However, the seat cover 302 may be in a position that covers important features of the bench seat 200 such as a center seat belt 420 and/or a center console 462 (as shown in FIG. 8 and FIG. 13, respectively) of the bench seat 200. Thus, additional steps may be needed before the bench seat 200 is ready for use.

Figure 9:
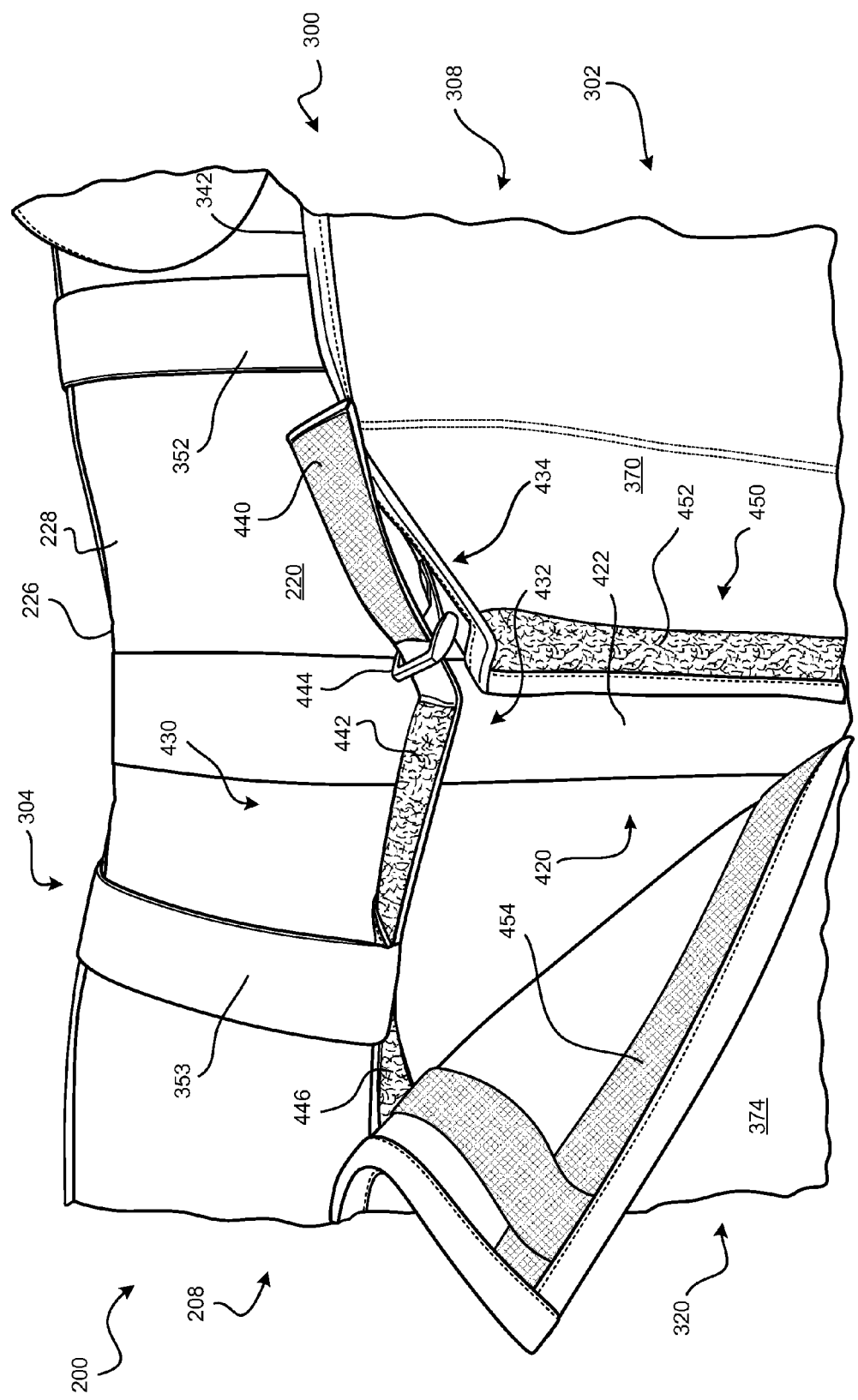
FIG. 9 is a front elevation, perspective view of a portion of the bench seat and apparatus of FIG. 2 with intermediate section of the backrest portion of the seat cover fully detached from the first side of the backrest portion to route the center seat belt outside the backrest portion.
Figure 10:
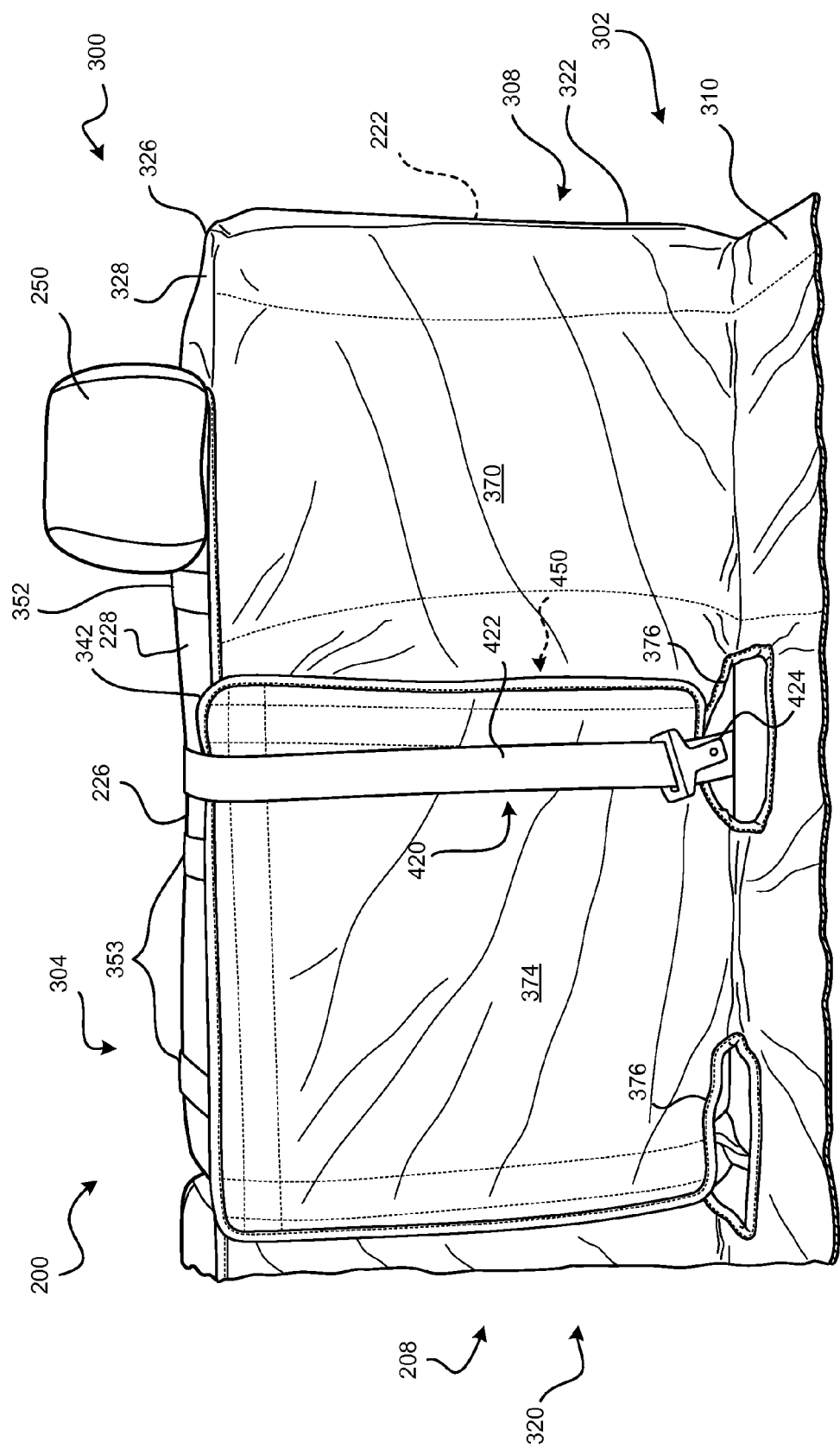
FIG. 10 is a front elevation, perspective view of a portion of the bench seat and apparatus of FIG. 2 with the center seat belt routed outside the backrest portion.

More specifically, if the bench seat 200 does not have a center console 462, or the user does not want to use the center console 462, and the bench seat 200 does not have a center seat belt 420 with a lap belt, installation of the apparatus 300 may be complete, per the query 130 and the query 140. If needed, the strap, tongue, and buckle of the center seat belt 420 may simply be pulled through the seat belt openings 376 of the forward backrest panel 320 in preparation for use. FIG. 8, FIG. 9, and FIG. 10 represent the performance of the step 142, the step 144, and the step 146 of FIG. 1 in the event that the bench seat 200 does have a center seat belt 420 with a shoulder harness 422.

Referring to FIG. 8, a front elevation, perspective view illustrates a portion of the bench seat 200 and apparatus 300 of FIG. 2, with the intermediate section 374 of the backrest portion 308 of the seat cover 302 partially entirely detached from the first side section 370 of the backrest portion 308. As shown, the bench seat 200 may have a center seat belt 420, which may have a shoulder harness 422 and a tongue member 424. The tongue member 424 may be insertable into a buckle (not shown) that is accessible via the seat belt openings 376 proximate the first side section 370.

A front flexible strap 430 may underlie the first side section 370, the second side section 372, and the intermediate section 374, and may be anchored to the first side section 370 and the second side section 372. More specifically, the front flexible strap 430 may have a first strap portion 432 secured to the second side section 372 and a second strap portion 434 (illustrated in FIG. 9) secured to the first side section 370.

The proximal end 390 of each of the outboard support straps 352 may be secured directly to the first side section 370 or the second side section 372, while the proximal end 390 of each of the inboard support straps 353 may be secured to the front flexible strap 430. The front flexible strap 430 may have an exposed loop surface 446 that faces toward the intermediate section 374 and helps to keep the intermediate section 374 in place until it is deliberately detached from the front flexible strap 430.

In order to obtain access to the center seat belt 420 with the seat cover 302 in place on the bench seat 200, the intermediate section 374 may be detached from the first side section 370. The intermediate section 374 may be detachably attached to the first side section 370 through the use of a first attachment mechanism 450. The first attachment mechanism 450 may be configured in many different ways, and may include any of a variety of fasteners including but not limited to nuts, bolts, screws, clips, hook and loop fasteners, adhesives, and the like.

In the embodiment of FIG. 8, the first attachment mechanism 450 may be a hook and loop fastening system with a loop surface 452 on the outward-facing surface of the first side section 370 that receives a hook surface 454 on the inward-facing surface of the intermediate section 374.

Accordingly, the intermediate section 374 may relatively easily be detached from the first side section 370 by grasping the intermediate section 374 and pulling it forward relative to the first side section 370. The hook surface 454 on the intermediate section 374 may detach from the loop surface 452 of the first side section 370, thus allowing the forward backrest panel 320 to open as shown in FIG. 8. As illustrated in FIG. 8, the forward backrest panel 320 may comprise an upper extremity 377 and a lower extremity 379 when the seat cover 302 is in an installed configuration. Thus, when the seat cover 302 is in an installed configuration, each of the first side section 370, second side section 372 and intermediate section 374 may extend from the upper extremity 377 to the lower extremity 379 of the forward backrest panel 320. Accordingly, the intermediate section 374 is intermediate a first side section 370 and the second side section 372 and completely separates the first side section 370 from the second side section 372.

Referring to FIG. 9, a front elevation, perspective view illustrates a portion of the bench seat 200 and apparatus 300 of FIG. 2, with the Intermediate section 374 of the backrest portion 308 of the seat cover 302 fully detached from the first side section 370 of the backrest portion 308 to route the center seat belt 420 outside the backrest portion 308.

Each end of the front flexible strap 430 may be detachably attached to the corresponding one of the first side section 370 and the second side section 372 through the use of any of a wide variety of fastening systems known in the art, including but not limited to nuts, bolts, clips, hook and loop fasteners, adhesives, and the like. In the embodiment of FIG. 8, the front flexible strap 430 may be detachably attached to the first side section 370 and the second side section 372 through the use of hook and loop fastening systems.

Thus, for example, the first strap portion 432 of the front flexible strap 430 may have a first strap hook portion 440 and a first strap loop portion 442. The first strap hook portion 440 may be attached at any position along the length of the first strap loop portion 442. Thus, the first strap portion 432 may have a variable length similar to that of the second portion 382 of the rear flexible strap 350. The first strap portion 432 of the front flexible strap 430 may be secured to a loop 444 of the second strap portion 434 that is, in turn, secured to the first side section 370. The second strap portion 434 of the front flexible strap 430 and the second side section 372 may be attached together in a similar manner.

Once the hook surface 454 has been detached from the loop surface 452 and the exposed loop surface 446, the first strap portion 432 of the front flexible strap 430 may be detached from the first side section 370 by detaching the first strap hook portion 440 from the first strap loop portion 442 and then pulling the first strap portion 432 of the front flexible strap 430 out of the loop 444. Then, the center seat belt 420 may be pulled forward in front of the first side section 370 and/or the intermediate section 374. This may complete the step 144 of FIG. 1.

The preceding detachment steps may then be reversed to re-attach the intermediate section 374 to the first side section 370 in the step 146. For example, the first strap hook portion 440 may be inserted through the loop 444 of the second strap portion 434 and may be re-attached to the first strap loop portion 442. Then, the hook surface 454 may be re-attached to the loop surface 452 and the exposed loop surface 446.

Referring to FIG. 10, a front elevation, perspective view illustrates a portion of the bench seat 200 and apparatus 300 of FIG. 2, with the center seat belt 420 routed outside the backrest portion 308. The center seat belt 420 may be used by a passenger seated in the center of the bench seat 200. However, if the shoulder harness 422 is anchored to a location below the first attachment mechanism 450, further routing of the center seat belt 420 may be needed, per the query 150, the step 152, the step 154, and the step 156. This will be shown and described in connection with FIG. 11.

Figure 11:
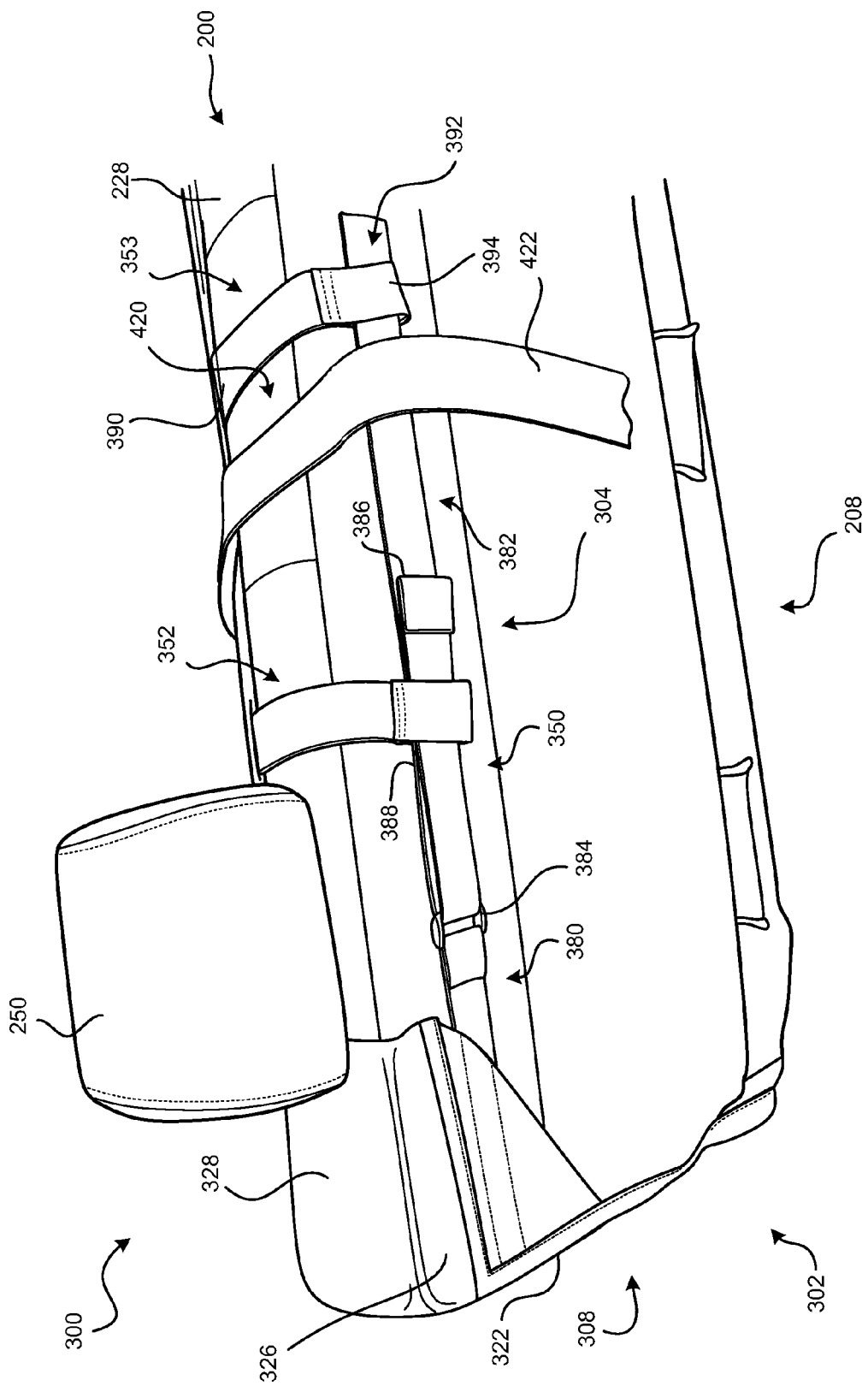
FIG. 11 is a rear elevation, perspective view of a portion of the bench seat and apparatus of FIG. 2 with the center seat belt routed outside of the rear flexible strap.

Referring to FIG. 11, a rear elevation, perspective view illustrates a portion of the bench seat 200 and apparatus 300 of FIG. 2, with the center seat belt routed outside of the rear flexible strap 350. FIG. 11 represents the routing of the shoulder harness 422 in the event that the shoulder harness 422 is anchored below the first attachment mechanism 450, for example, toward the bottom of the rearward-facing backrest member surface 226. Thus, FIG. 11 may represent the configuration of the bench seat 200 and the apparatus 300 after the step 152, the step 154, and the step 156 have been performed.

In order to carry out the step 152, the rear flexible strap 350 may be released by detaching the second portion 382 from the first portion 380 of the rear flexible strap 350. This may be done by pulling the hook end portion 386 away from the loop end portion 388, and then drawing the second portion 382 out of the loop 384. Then, in the step 154, the shoulder harness 422 may be passed to the exterior of the rear flexible strap 350 so that the rear flexible strap 350 is between the shoulder harness 422 and the rearward-facing backrest member surface 226.

Once the shoulder harness 422 has been properly positioned, the rear flexible strap 350 may be re-attached and re-tightened in the step 156. This may be done by inserting the second portion 382 into the loop 384, pulling the hook end portion 386 to tighten the rear flexible strap 350, and then pressing the hook end portion 386 against the adjacent location of the loop end portion 388. The apparatus 300 may then be in a fully-installed configuration, assuming the bench seat 200 does not have a center console 462 that is to be used.

Figure 12:
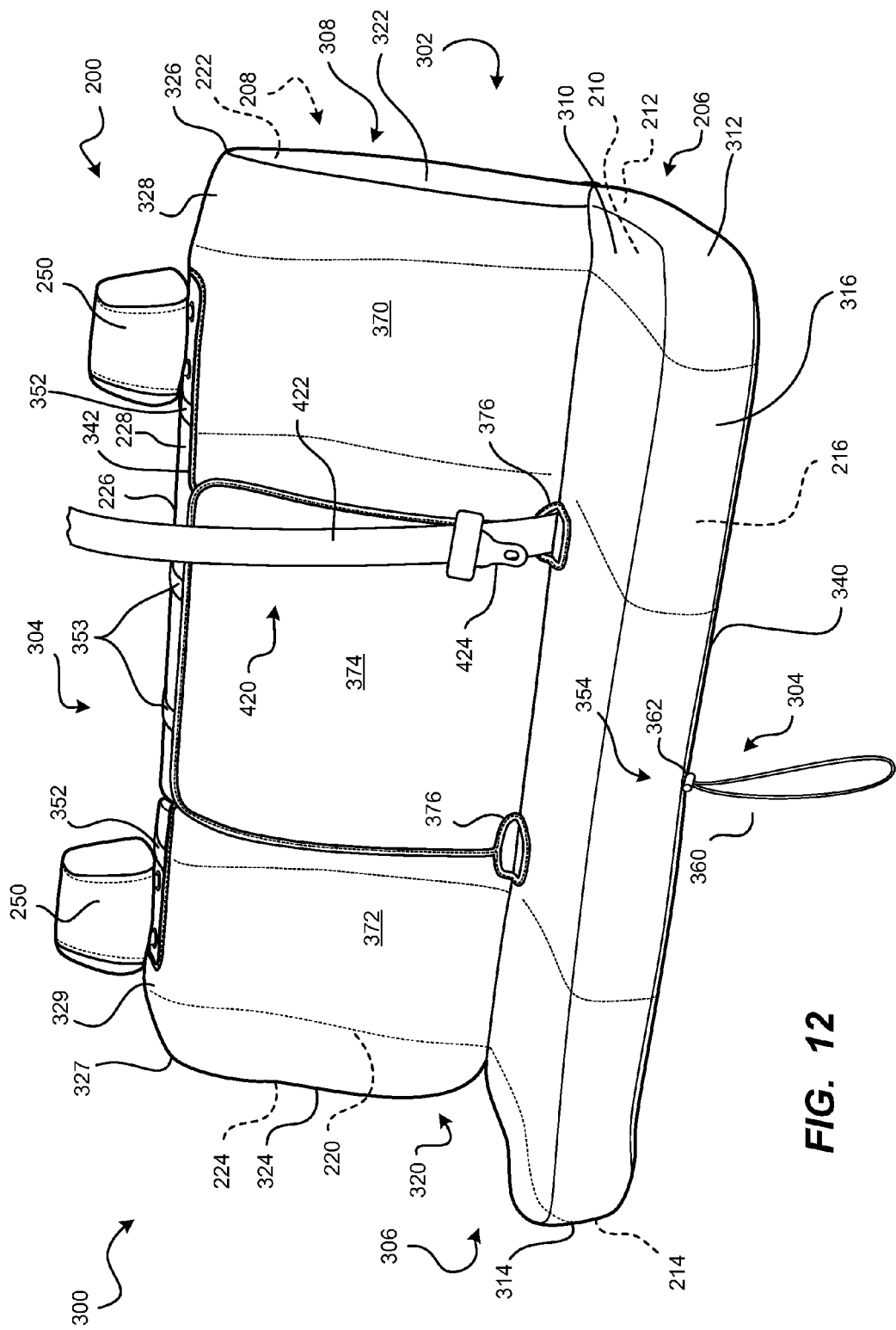
FIG. 12 is a front elevation, perspective view of the bench seat and apparatus of FIG. 2 in the installed configuration.

Referring to FIG. 12, a front elevation, perspective view illustrates the bench seat 200 and apparatus 300 of FIG. 2, in the installed configuration. The center seat belt 420 may be used by a center passenger on the bench seat 200. The center seat belt 420 may be used in connection with a buckle extending through the seat belt opening 376 adjacent to the first side section 370.

If the bench seat 200 does have a center console 462 that is to be used, the step 132 and the step 134 may be carried out as set forth in the description of FIG. 1. This will be further shown and described in connection with FIG. 13.

Referring to FIG. 13, a front elevation, perspective view illustrates the bench seat 200 and apparatus 300 of FIG. 2, in the installed configuration, with the intermediate section 374 of the backrest portion 308 of the seat cover 302 detached from the first side section 370 and the second side section 372, and a center console 462 of the bench seat 200 deployed between the first side section 370 and the second side section 372.

As shown, the forward-facing backrest member surface 220 of the backrest member 208 of the bench seat 200 may have a center section 460, from which the center console 462 may deploy. This may be carried out by detaching the intermediate section 374 from the first side section 370 and the second side section 372. The intermediate section 374 may be detached from the first side section 370 and the second side section 372 by pulling the hook surface 454 away from the loop surface 452 of the first side section 370 and the corresponding loop surface (not shown) of the second side section 372.

If needed, the front flexible strap 430 may be detached from the first side section 370 and the second side section 372 as shown and described in connection with FIG. 9. However, since the front flexible strap 430 is positioned proximate the top of the forward backrest panel 320, the front flexible strap 430 may not need to be detached from the first side section 370 and the second side section 372 in order to enable the center console 462 to deploy without interference.

Once the intermediate section 374 has been detached from the first side section 370 and the second side section 372, the intermediate section 374 may be rolled or folded against the upward support panel 310 of the support portion 306, as shown. Thus, the intermediate section 374 may be positioned underneath the location at which the center console 462 deploys. In the event that a passenger is to occupy the center of the bench seat 200, the center console 462 may easily be returned to its original configuration, and the intermediate section 374 may be re-attached to the first side section 370 and the second side section 372 as in the step 146.

It is understood that any specific order or hierarchy of steps in any disclosed process or method comprises one example of an embodiment of such a process or a method. Based upon design preferences, it is understood that the specific order or hierarchy of steps in the processes or methods may be rearranged while remaining within the scope of the present disclosure. The accompanying method claims present elements of the various steps in a sample order, and are not meant to be limited to the specific order or hierarchy presented.

The previous description of the disclosed aspects is provided to enable any person skilled in the art to make or use the present disclosure. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope consistent with the principles and novel features disclosed.

What is claimed is:

1. An apparatus for covering a bench seat of a vehicle, the apparatus comprising:
a seat cover having an installed configuration, the seat cover comprising:
a support portion comprising:
an upward support panel;
a first lateral support panel;
a second lateral support panel; and
a forward support panel;
wherein, in the installed configuration, the support portion defines a support recess; and
a backrest portion comprising:
a forward backrest panel;
a first lateral backrest panel;
a second lateral backrest panel;
a first rear backrest panel; and
a second rear backrest panel;
wherein, in the installed configuration, the backrest portion defines a backrest recess and the first rear backrest panel and the second rear backrest panel cooperate to define an intermediate backrest gap,
wherein the first rear backrest panel comprises a first triangular panel member bounded by a first upper seam, a first outer seam, and a first peripheral edge of the first triangular panel member extending between the first upper seam and the first outer seam,
wherein a length of the first peripheral edge between the first outer seam and the first upper seam is greater than either a length of the first upper seam between the first peripheral edge and the first outer seam or a length of the first outer seam between the first upper seam and the first peripheral edge,
wherein the second rear backrest panel comprises a second triangular panel member bounded by a second upper seam, a second outer seam, and a second peripheral edge of the second triangular panel member extending between the second upper seam and the second outer seam,
wherein a length of the second peripheral edge between the second outer seam and the second upper seam is greater than either a length of the second upper seam between the second peripheral edge and the second outer seam or a length of the second outer seam between the second upper seam and the second peripheral edge; and
a plurality of anchoring elements secured to the seat cover, wherein, in the installed configuration, the anchoring elements cooperate to secure the seat cover to the bench seat such that:
the upward support panel substantially covers an upward-facing support member surface of a support member of the bench seat;
the first and second lateral support panels each cover at least a portion of one of a first laterally-facing support member surface and a second laterally-facing support member surface of the support member;
the forward support panel covers at least a portion of a forward-facing support member surface of the support member;
the forward backrest panel substantially covers a forward-facing backrest member surface of a backrest member of the bench seat;
the first and the second lateral backrest panels each cover at least a portion of one of a first laterally-facing backrest member surface and a second laterally-facing backrest member surface of the backrest member, the first and the second laterally-facing backrest member surfaces being disposed on opposite extremities of the backrest member; and
the first and second rear backrest panels each cover a portion of a rearward-facing backrest member surface,
wherein the forward backrest panel comprises a first side section, a second side section, an intermediate section disposed intermediate the first side section and the second side section, and a first attachment mechanism that detachably secures the intermediate section to the first side section such that the intermediate section is entirely detachable from the first side section, wherein, in the installed configuration, the intermediate section does not extend to or abut any portion of the rearward-facing backrest member surface;
wherein, in the installed configuration, the forward backrest panel comprises an upper extremity and a lower extremity, the intermediate section extending from the upper extremity to the lower extremity;

wherein the plurality of anchoring elements comprises a single rear flexible strap that, in the installed configuration, extends between the first and the second triangular panel members, the rear flexible strap being fixable at one of a plurality of lengths to adjust a tension applied between the first and second triangular panel members, wherein, in the installed configuration, besides the single rear flexible strap, the apparatus is devoid of any other strap or connector between the first rear backrest panel and the second rear backrest panel;

further comprising a front flexible strap, wherein, in the installed configuration, the front flexible strap selectively secures the first side section to the second side section and is positioned between the intermediate section of the forward backrest panel and the forward-facing backrest member surface of a backrest member of the bench seat, and wherein the anchoring elements further comprise at least two support straps, each support strap having a distal end and a proximal end, the proximal end of each support strap being secured to the front flexible strap and the distal end of each support strap including a loop for receiving the rear flexible strap in an installed configuration.

2. The apparatus of claim 1, wherein the rear flexible strap comprises a first portion and a second portion, the first portion being selectively detachable to the second portion to enable positioning of a portion of a seatbelt for the bench seat on an exterior side of the rear flexible strap without requiring motion of the backrest portion out of the installed configuration.

3. The apparatus of claim 2, wherein:
the first side section, in the installed configuration, is positioned to reside rearward of a first side passenger region of the vehicle;
the second side section, in the installed configuration, is positioned to reside rearward of a second side passenger region of the vehicle; and
the intermediate section, in the installed configuration, is positioned to reside rearward of a center passenger region of the vehicle.

4. The apparatus of claim 3, wherein the forward backrest panel further comprises a second attachment mechanism that detachably secures the intermediate section to the second side section such that the intermediate section can be detached from the first side section and the second side section to permit a center console of the backrest member to extend forward between the first side section and the second side section.

5. The apparatus of claim 1, wherein the anchoring elements further comprise a draw string element secured to distal edges of the lateral support panels and the forward support panel, wherein, in the installed configuration, the draw string element is tightened to urge the distal edges toward each other.

6. The apparatus of claim 1, wherein the anchoring elements further comprise:
a lower flexible connector comprising a distal end and a proximal end secured to the seat cover; and
a hook member secured to the distal end of the lower flexible connector,
wherein the lower flexible connector has a length selected such that, in the installed configuration, the hook member is attachable to a rigid feature of the vehicle, wherein the rigid feature is displaced from the bench seat.

7. The apparatus of claim 1, wherein the first rear backrest panel is secured to the first lateral backrest panel and the second rear backrest panel is secured to the second lateral backrest panel, each of the first and second lateral backrest panels being secured to the forward backrest panel,
wherein, in the installed configuration, the first and second rear backrest panels, combined, cover only a portion of the rearward-facing backrest member surface of the backrest member; and
wherein the rear flexible strap is secured to the first and second rear backrest panels.

8. The apparatus of sample claim 1, wherein, in an installed configuration, each of the at least two support straps extends over a portion of the forward-facing backrest member surface, a portion of an upward-facing backrest member surface and a portion of the rearward-facing backrest member surface.

\* \* \* \* \*

UNITED STATES PATENT AND TRADEMARK OFFICE
CERTIFICATE OF CORRECTION

PATENT NO. : 9,669,742 B1
APPLICATION NO. : 14/187129
DATED : June 6, 2017
INVENTOR(S) : Clark C. Bailey It is certified that error appears in the above-identified patent and that said Letters Patent is hereby corrected as shown below:

In the Specification

In Column 12, Line 32, please replace "cover 302 partially entirely detached" with --cover 302 entirely detached--

Signed and Sealed this
Sixth Day of March, 2018

Andrei Iancu
*Director of the United States Patent and Trademark Office*